United States Patent [19]
Turner et al.

[11] Patent Number: 5,561,287
[45] Date of Patent: Oct. 1, 1996

[54] DUAL PHOTODETECTOR FOR DETERMINING PEAK INTENSITY OF PIXELS IN AN ARRAY USING A WINNER TAKE ALL PHOTODIODE INTENSITY CIRCUIT AND A LATERAL EFFECT TRANSISTOR PAD POSITION CIRCUIT

[75] Inventors: Richard M. Turner, Boulder; Kristina T. Johnson, Longmont, both of Colo.; David A. Jared, Mountain View, Calif.

[73] Assignee: Board of Regents of the University of Colorado, Boulder, Colo.

[21] Appl. No.: 316,521

[22] Filed: Sep. 30, 1994

[51] Int. Cl.$^6$ .................................................... G01J 1/42
[52] U.S. Cl. .................................. 250/208.2; 250/214 R; 257/290
[58] Field of Search ........................... 250/208.2, 214 R, 250/214.1; 257/290, 291

[56] References Cited

U.S. PATENT DOCUMENTS

| | | |
|---|---|---|
| 3,660,667 | 5/1972 | Weimer . |
| 4,874,939 | 10/1989 | Nishimoto et al. . |
| 4,877,951 | 10/1989 | Muro . |
| 4,879,250 | 11/1989 | Chan . |
| 4,887,140 | 12/1989 | Wang . |
| 4,945,242 | 7/1990 | Berger et al. . |
| 4,975,750 | 12/1990 | Hayashi et al. . |
| 5,027,177 | 6/1991 | Vasudev . |
| 5,059,789 | 10/1991 | Salcudean ........................ 250/206.1 |
| 5,059,814 | 10/1991 | Mead et al. . |
| 5,220,643 | 6/1993 | Collings . |
| 5,225,706 | 7/1993 | Berger et al. . |
| 5,235,195 | 8/1993 | Tran et al. . |
| 5,237,197 | 8/1993 | Snoeys et al. . |
| 5,239,193 | 8/1993 | Benton et al. . |
| 5,241,575 | 8/1993 | Miyatake et al. . |
| 5,283,608 | 2/1994 | Goo et al. ........................... 354/403 |
| 5,386,123 | 1/1995 | Hubble, III et al. . |

OTHER PUBLICATIONS

Kawasaki et al. (1990) "An Array-type PSD (Position-sensitive Detector) for Light Pattern Measurement", *Sensors and Actuators* A21–A23:529–533.
Vassilev et al. (1977) "The Photoeffect in Silicon Planar Positional Photon-detectors with a High Resistivity Doped Channel", *Solid-State Electronics* 20:999–1001.
Torkel Wallmark, J. (1957) "A New Semiconductor Photocell Using Lateral Photoeffect", *Proceedings of the IRE* (45): 474–483.

*Primary Examiner*—Edward P. Westin
*Assistant Examiner*—Stephen Calogero
*Attorney, Agent, or Firm*—Greenlee, Winner and Sullivan, P.C.

[57] ABSTRACT

A semiconductor device comprising a dual photodetector for use in an array to locate points of peak intensities incident upon the array. Each pixel in the array is comprised of a dual photodetector element. An n-type well is located within a p-substrate with highly doped p-contact areas located along the periphery of the n-well at the surface. A metal or polysilicon gate electrode covers the surface between the p-contacts and an applied gate voltage creates an inverted p-channel to form a lateral effect phototransistor. A second photodetector is formed at the junction of the n-well and p-substrate. The second photodetector from each pixel produces a current which is connected to a processing circuit to determine which pixel is the brightest above a designated threshold. All pixels above the threshold are sequentially identified. For the "bright" pixels, photogenerated currents produced by the lateral effect phototransistors are analyzed by another processing circuit to produce the points of peak intensity within the bright pixel areas.

12 Claims, 3 Drawing Sheets

DUAL PHOTODETECTOR FOR DETERMINING PEAK INTENSITY OF PIXELS IN AN ARRAY USING A WINNER TAKE ALL PHOTODIODE INTENSITY CIRCUIT AND A LATERAL EFFECT TRANSISTOR PAD POSITION CIRCUIT

This invention relates to a photodetector array for determining the location of peak irradiation resultant from incident light.

BACKGROUND OF THE INVENTION

Photodiode and CCD arrays are used for the location of peak irradiation. Such devices can offer good resolution but generally require an exhaustive search of the data from each detector element, which can limit the speed at which peaks are found. To obtain greater speed, it may be necessary to sacrifice position resolution. Such arrays do have an advantage in their ability to identify multiple peak locations.

Large area position detectors such as lateral effect photodiodes and quadrant detectors are useful for the location of a single peak in an input scene. Lateral effect devices provide high resolution through circuits which resolve the point of peak intensity within the large area in which lateral effect currents are measured.

Applications of devices which determine the location of peak intensities include pattern recognition systems (correlators), general peak position measurements such as that used in optical measurement systems and object tracking, optical detection for spectrometry, speckle interferometry, particle measurement and in establishing the correct position of optical elements and other machine parts during the manufacture of machines or during machine operation.

The ability to find the peak position within an area utilizing the photocell lateral effect was discussed by Walmark, "A New Semi-conductor Photocell using Lateral Photo Effect". Proceedings of the IRE 45,474 (1957). Walmark reports on a one dimensional lateral effect photocell to detect peak position within 100 angstroms and explains how the effect can be extended to a two dimensional photodetector.

U.S. Pat. No. 4,887,140 to Wang discloses a two dimensional lateral effect position sensitive device in which the area of the detector capable of providing a linear response to incident light is increased.

"An Array Type Position Sensitive Detector to Light Pattern Measurement" by Kawasaki et al., Sensors and Actuators A21–A23, 529 (1990) relates to an array of one dimensional lateral effect position sensors.

U.S. Pat. No. 5,059,814 to Mead et al. (1991) discloses a "winner take all" circuit for employment in a neural network computing system to indicate an input path of highest value. The circuit can also show the input of highest value within subgroups.

U.S. Pat. No. 4,945,242 to Berger et al. discloses an array of photodetectors wherein each pixel contains two photosensitive elements, one stacked on top of the other. The upper and lower photosensitive elements respond to different wavelengths of radiation making it possible to acquire two images simultaneously at different wavelengths.

U.S. Pat. No. 5,239,193 to Benton et al. discloses CMOS circuitry on the front surface of a well in combination with a photodiode on the well periphery.

As shown above the prior art reveals photosensors using the lateral effect with circuits that can locate the peak intensity within a pixel. Each of these peak intensity measurements within a pixel array can be compared to determine the location of peak intensity within the area of the array. To find the locations of multiple peaks, the prior art also shows that CCD arrays or photocell arrays are commonly used in combination with comparison circuits. It is the general object of this invention to provide high speed, high resolution location of multiple points of peak irradiation in the area of a photodetector array through minimizing the number of pixels while retaining high resolution.

SUMMARY OF THE INVENTION

This invention provides a one or two dimensional array of photodetector elements each of which is itself a one or two dimensional analog position sensor and a sensor of the level of total irradiation within the pixel area. The photodetector elements are preferably metal oxide semi-conductor (MOS) devices, comprising a dual photodetector that provides analog position information as well as a distinct signal indicating total optical intensity. Each element of the array corresponds to a pixel and is comprised of the dual photodetector. The element includes a substrate of a first polarity with a well of an opposite polarity located therein. Total optical intensity for each pixel is obtained from a photodiode located at the interface of the well and substrate. The element also comprises a lateral effect phototransistor formed near the surface of the well in which two or four highly doped regions of a polarity opposite to that of the well form contacts. A metal or polysilicon electrode with a thin dielectric layer separating it from the well forms the gate electrode, which allows the formation of an inverted channel between the contacts through application of a voltage to the gate electrode.

The invention uses competition between the output of each buried well/substrate detector in the array to sequentially locate bright pixels in an input scene. For those pixels identified as bright, the lateral effect phototransistor provides analog information to locate the point of peak intensity within the pixel area. High resolution position information about peak locations within a pixel is obtained from the division of photogenerated current within the transistor channel based upon the lateral photo-effect. By utilizing the analog approach to locate peak values, the number of pixels can be reduced, thus providing fewer comparisons in the competition and thereby enabling faster determination of which pixels are brightest. By utilizing the competition approach, the number of pixels for which an analog peak determination is needed is reduced to only those few pixels having bright peaks.

The above-mentioned and other features and objects of the invention and the manner of attaining them will become more apparent and the invention itself will be best understood by reference to the following detailed description of the invention taken in conjunction with the accompanying drawing.

BRIEF DESCRIPTION OF THE DRAWING

The invention is set forth in detail below with reference to the accompanying drawing, a brief description of which follows.

DETAILED DESCRIPTION OF THE INVENTION

Figure 1:
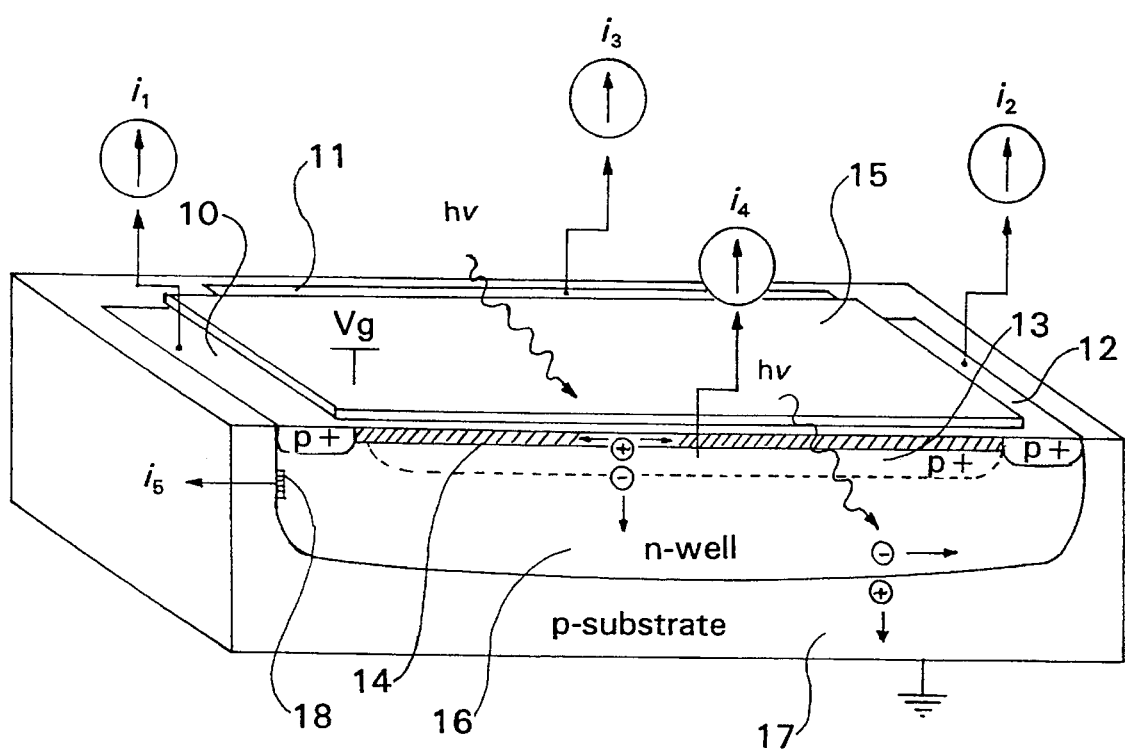
FIG. 1 is a perspective view in cross-section of a single pixel area comprising a dual photodetector in accordance with the invention.

When reference is made to the drawing like numerals indicate like parts and structural features in the various figures.

FIG. 1 shows a perspective sectional view of a single pixel area within an integrated semi-conductor photodetector device according to the invention. The photodetector element comprises four highly doped p-type regions 10–13 in an n-type well 16 and a polysilicon electrode (gate) 15 on a planar surface of well 16. The entire well, containing the structure is located on a p-type substrate 17. The four highly doped regions 10–13 act as contacts and provide access to the photocurrent flowing from the channel region 14. The channel region is formed along the planar surface of well 16 by application of a voltage Vg to the gate electrode 15 which extends between regions 10–13. Channel 14, gate 15, and contacts 10–13 comprise a lateral effect phototransistor. The photodetector devices may also be made by reversing the polarity of each of the semiconductor materials, so that the n-type regions become p-type, and the p-type regions become n-type.

Two distinct depletion regions exist comprising a dual photodetector within the element. One depletion region is between the channel 14 and the well 16 and the other between the well and the substrate 17. Photo generated charge carriers give rise to a photocurrent when they are created in either of the depletion regions or when they diffuse to one or the other of the depletion regions. Photo current is measured through the four contacts 10–13 to the channel and through the contact 18 to the well. The four channel currents, $i_1$, $i_2$, $i_3$, and $i_4$ are divided based on the lateral photo effect and are used to compute the position of the center of energy of the incident illumination on the individual photodetector element. The horizontal (x) and vertical (y) positions are computed from the relations $$X = \frac{L}{2}\left[\frac{i_1 - i_2}{i_1 + i_2}\right] \quad (1)$$

and $$y = \frac{L}{2}\left[\frac{i_3 - i_4}{i_3 + i_4}\right] \quad (2)$$

where L is the distance between the opposing contacts of the photodetector. A circuit 22 for performing these computations may be included on the same chip as the photodetector array, or may be implemented off-chip.

Figure 2A:
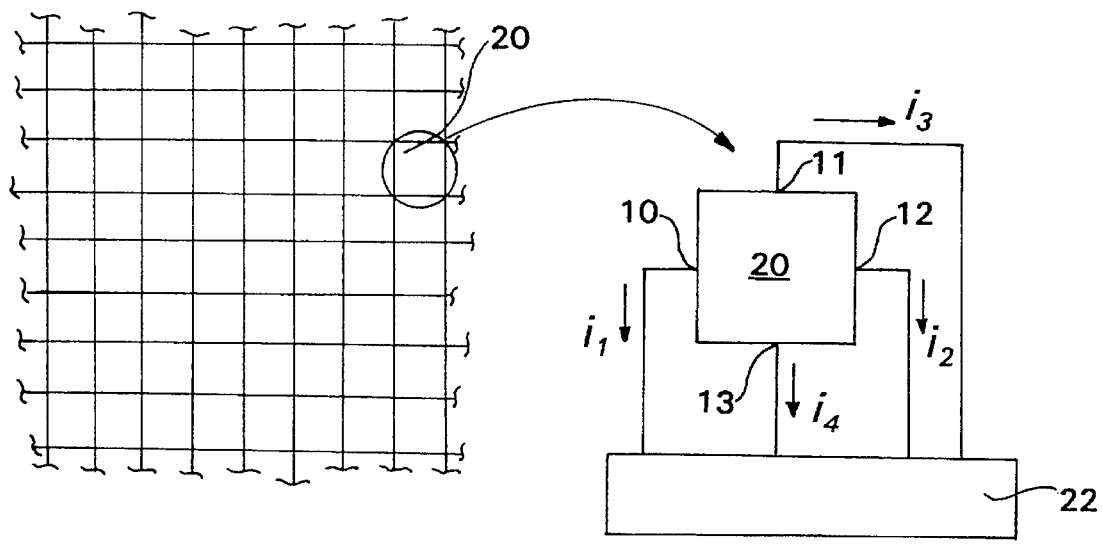
FIG. 2A shows a two-dimensional array with one pixel magnified to show connections to a circuit for analog peak resolution in accordance with the invention.

FIG. 2A shows a two dimensional array of pixel areas with the surface of one pixel area 20 magnified to show connections from the contacts 10–13 for currents $i_1$–$i_4$ to processing circuit 22.

Figure 2B:
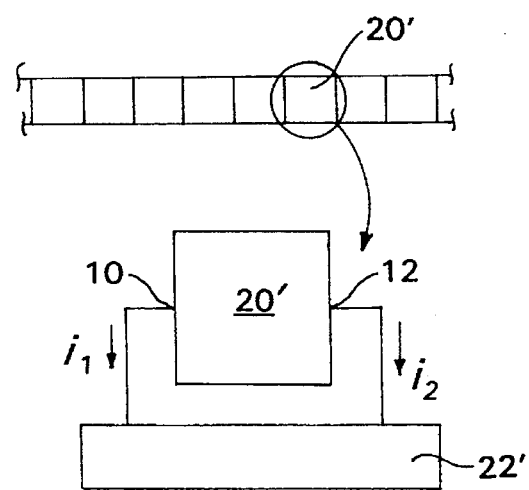
FIG. 2B is similar to FIG. 2A for a one-dimensional linear array.

FIG. 2B shows a one dimensional array of pixel areas with one pixel area 20' magnified to show connections for currents $i_1$ and $i_2$ to circuit 22'. Only the X coordinate for the spot of peak intensity is found for the linear array.

Figure 3:
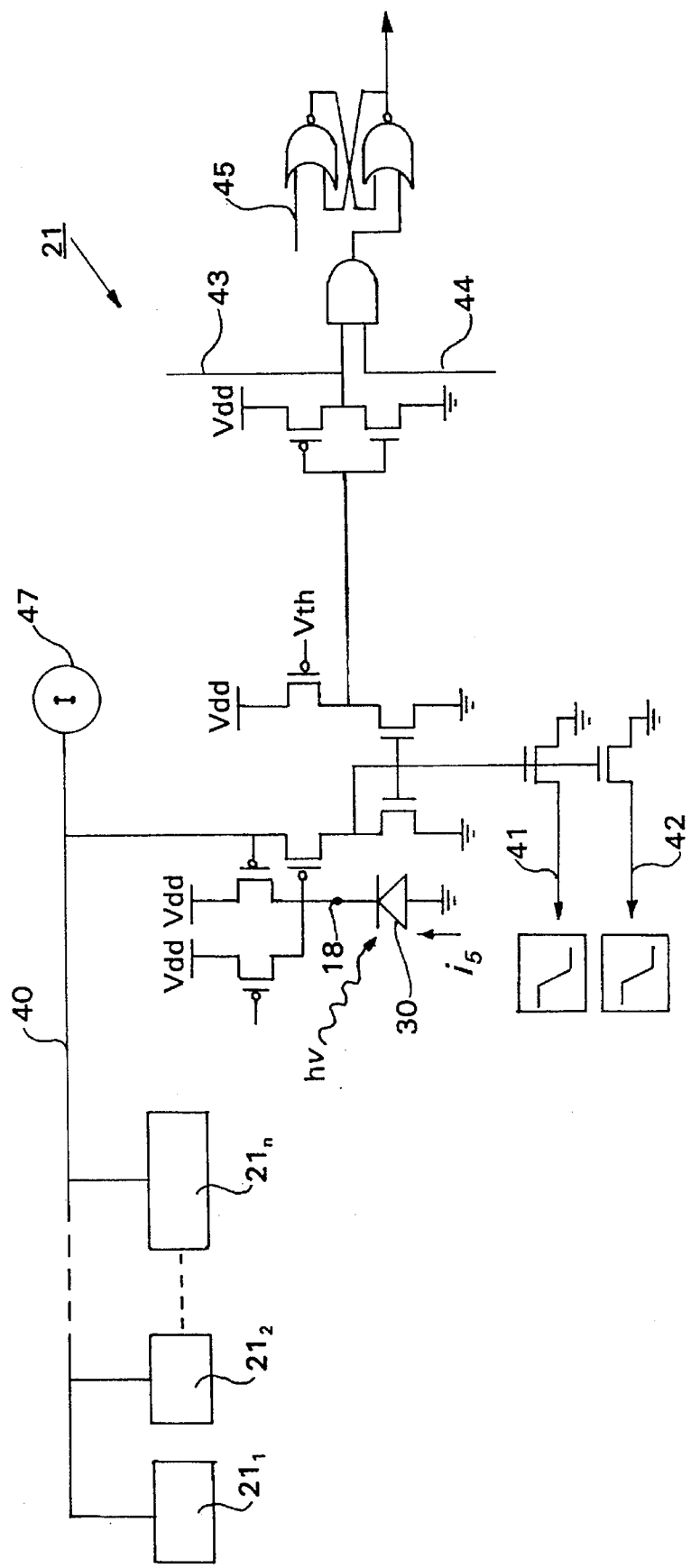
FIG. 3 shows a circuit used to determine which pixel is brightest in the array of either FIG. 2A or FIG. 2B.

The distinct photocurrent flowing from the well 16 is used to determine the total intensity of the incident illumination on the pixel area and to determine the location of the brightest pixel in the array by means of circuit network 21 shown in FIG. 3. Circuit network 21 provides means for comparing all of the photocurrents $i_5$ from each element and determining the largest current. The circuit also allows the winning pixel to be disabled so that additional bright pixels may report their location. In that manner, multiple peak intensities within the array may be found.

In FIG. 3, the photodetector 30 for producing current $i_5$ corresponding to pixel 20 is shown with contact 18 connected to the competitive processing circuit 21. Photocurrent $i_5$ flowing from contact 18 drives circuit 21 and each pixel in the n-pixel array has an identical processing circuit $21_1$ to $21_n$. Inhibition line 40 is connected to all the circuits 21 and to an external current source 47. The competitive winner is the largest well/substrate photocurrent $i_5$ produced by the photodiode 30 and corresponding photodiodes in the other pixels. The largest photocurrent takes control of inhibition line 40 turning on the "winning" element and inhibiting the others. Circuit output is thresholded by voltage $V_{th}$ with digital output signals 41 and 42 indicating the row and column identification of the brightest pixel. Threshold voltage $V_{th}$ is adjustable so that the device may accommodate various intensity ranges. Output signal 43 enables the analog position circuit 22 (FIGS. 2A and 2B) corresponding to the winning pixel to resolve the coordinates of peak position within the winning pixel. An external signal, $V_{read}$, applied on line 44 disables the winning circuit 21 so that the network of circuits can determine the next brightest pixel. The process continues until all bright pixels, i.e., pixels with a total intensity level exceeding the threshold voltage, have been identified and the analog position of the peak intensity within all of the bright pixels has been determined. A reset voltage signal is applied on line 45 to re-enable all circuits in the network.

By the use of a "winner take all" approach to finding which pixel area is the most highly irradiated prior to analyzing the point of peak intensity within the pixel area, a significant time savings is realized since the circuits 22 need resolve only the bright pixel areas. Also, by utilizing the lateral effect approach for determining the point of peak intensity within a pixel area, the number of pixel areas can be significantly reduced from the number necessary in the ordinary CCD approach and still maintain high resolution. As a consequence, fewer comparisons need be made over the surface of the array to determine the pixel area of peak intensity. This accomplishes savings in the amount of circuitry needed and the time taken to identify bright pixels.

It should be noted that the dual photodetector combination of this invention can be utilized in a one dimensional array as well as within the two dimensional array illustrated in FIG. 2A. The difference is that a single interpolation along a chosen axis would be performed. FIG. 2B illustrates a linear array in which pixel area 20 is magnified to show the connection for currents $i_1$ and $i_2$ to circuit 22' for determination of the spot of peak intensity within pixel 20. FIG. 3 shows the circuit 21 which is used to determine the brightest pixels within the linear array by processing the currents $i_5$ from each pixel in the linear array in the same manner as described above for the two dimensional array. Thus, bright pixels in the linear array are determined and the circuits 22' are enabled to find the coordinates of the spots of peak intensity within the bright pixels.

The invention described herein provides a CMOS device that combines a first sensor which is an analog position sensor, with a second sensor that indicates total optical intensity. Both sensors are located within each pixel area. The array uses competition between the output of each second sensor, each of which are buried well/substrate detector elements, to sequentially locate bright peaks in the input scene. The first sensor provides high resolution position information about peak locations within a pixel area from the division of the photogenerated current within the transistor channel based upon the lateral photo effect. However, intra-pixel resolution need be examined only for those pixel areas known to contain bright peaks. The inventive device combines the resolution advantages of single peak detectors with the multiple peak capabilities of CCD and photodiode arrays all in one device and enables the determination of peak intensity locations without examining the output of perhaps, many thousands of detector elements within the array. In addition, processing electronics can be incorporated directly into the device by fabricating it using traditional silicon VLSI processes. Use of ordinary CMOS technology also allows for easy customization of the device to a particular optical system by varying pixel size and location, number of pixels, circuit sensitivities and output channels. This approach offers the advantages of speed, combination of detection and processing electronics on a VLSI chip, and ease of implementation.

Location of a peak to within submicron accuracy at the speed of the photodetector/electronics response time is realizable.

While the invention has been described above with respect to a specific embodiment, it should be understood that various changes in form and detail may be made therein by a person of skill in the art without departing from the spirit and scope of the invention which receives definition in the following claims.

What is claimed is:

1. An integrated photodetector device for determining the location of peak intensity irradiation employing interpixel competition and intra-pixel measurement, each pixel area in said device comprising:

a semiconductor substrate of a first polarity having a first planar surface area;

a well located within said substrate comprising semiconductor material of an opposite polarity wherein a photodiode junction occurs at the interface of the substrate and said well, said well having a planar surface area lying within the plane of said substrate first surface area;

a lateral effect phototransistor formed within said well along the planar surface thereof;

said device comprising an array of said pixel areas wherein said photodiode in each pixel area is connected to a first circuit for determining which pixel area is most highly irradiated, and wherein each phototransistor in each pixel area is connected to a second circuit for determining the location of the point of peak irradiation within the pixel area, whereby the points of peak irradiation within the area of said device may be found.

2. The device of claim 1 comprising a one dimensional array of pixel areas.

3. The device of claim 1 further including means for enabling the determination of intra-pixel peak location only for the pixel area determined to have the most highly irradiated area.

4. The device of claim 2 further including means for enabling the determination of intra-pixel peak location only for the pixel area determined to have the most highly irradiated area.

5. The device of claim 3 further including means for iteratively and cumulatively disabling the most highly irradiated pixel area and determining the next most highly irradiated pixel area.

6. The device of claim 4 further including means for iteratively and cumulatively disabling the most highly irradiated pixel area and determining the next most highly irradiated pixel area.

7. The device of claim 5 further including means for enabling the determination of intra-pixel peak location only for the currently active pixel area determined to have the most highly irradiated area.

8. The device of claim 6 further including means for enabling the determination of intra-pixel peak location only for the currently active pixel area determined to have the most highly irradiated area.

9. The device of claim 1 comprising a two dimensional array of pixel areas.

10. The device of claim 9 further including means for enabling the determination of intra-pixel peak location only for the pixel area determined to have the most highly irradiated area.

11. The device of claim 10 further including means for iteratively and cumulatively disabling the most highly irradiated pixel area and determining the next most highly irradiated pixel area.

12. The device of claim 11 further including means for enabling the determination of intra-pixel peak location only for the currently active pixel area determined to have the most highly irradiated area.

* * * * *